United States Patent
Hou

(10) Patent No.: US 9,202,427 B2
(45) Date of Patent: Dec. 1, 2015

(54) LCD AND METHOD FOR DRIVING THE SAME

(75) Inventor: Hung-lung Hou, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 13/511,656

(22) PCT Filed: Apr. 10, 2012

(86) PCT No.: PCT/CN2012/073694
§ 371 (c)(1),
(2), (4) Date: May 24, 2012

(87) PCT Pub. No.: WO2013/143166
PCT Pub. Date: Oct. 3, 2013

(65) Prior Publication Data
US 2015/0015615 A1    Jan. 15, 2015

(30) Foreign Application Priority Data
Mar. 30, 2012   (CN) .......................... 2012 1 0089834

(51) Int. Cl.
| | |
|---|---|
| *G09G 5/10* | (2006.01) |
| *G06F 3/038* | (2013.01) |
| *G09G 5/00* | (2006.01) |
| *G09G 3/36* | (2006.01) |
| *G02F 1/1343* | (2006.01) |
| *H04N 13/04* | (2006.01) |
| *G02F 1/1362* | (2006.01) |
| *G02F 1/1337* | (2006.01) |

(52) U.S. Cl.
CPC ............ *G09G 3/3655* (2013.01); *G02F 1/1362* (2013.01); *G02F 1/134363* (2013.01); *G09G 3/3696* (2013.01); *H04N 13/0454* (2013.01); *G02F 2001/133776* (2013.01); *G09G 3/3607* (2013.01); *G09G 3/3611* (2013.01); *G09G 3/3648* (2013.01); *G09G 2300/08* (2013.01)

(58) Field of Classification Search
CPC .............. G02F 1/134363; G02F 2001/134372; G02F 1/136286; G02F 1/13439; G02F 1/136209
See application file for complete search history.

(56) References Cited

U.S. PATENT DOCUMENTS

| | | | |
|---|---|---|---|
| 2002/0085156 A1* | 7/2002 | Lee ................................ | 349/141 |
| 2004/0125066 A1* | 7/2004 | Park et al. ........................ | 345/92 |
| 2005/0259059 A1* | 11/2005 | Park et al. ........................ | 345/89 |
| 2012/0140052 A1* | 6/2012 | Baek et al. ...................... | 348/58 |

\* cited by examiner

*Primary Examiner* — Alexander Eisen
*Assistant Examiner* — Nan-Ying Yang
(74) *Attorney, Agent, or Firm* — Mark M. Friedman

(57) ABSTRACT

An LCD includes multiple pixel units and a processing unit. The pixel units are used for displaying 2D or 3D images upon receiving 2D image signals or 3D image signals. The processing unit is used for outputting the plurality of 2D/3D image signals upon receiving a 2D/3D image enbaling signal. Each pixel unit includes a first pixel electrode, a second pixel electrode, and a third pixel electrode. The first pixel electrode is used for receiving a first voltage signal in response to the 2D or 3D image enbaling signal. The second pixel electrode is used for receiving the first voltage signal in response to the 2D image enbaling signal or for receiving a second voltage signal when corresponding to the 3D image enbaling signal. The third pixel electrode is used for receiving the plurality of 2D or 3D image signals. The first, second, and third pixel electrodes are disposed on the same substrate and are not connected to one another.

9 Claims, 4 Drawing Sheets

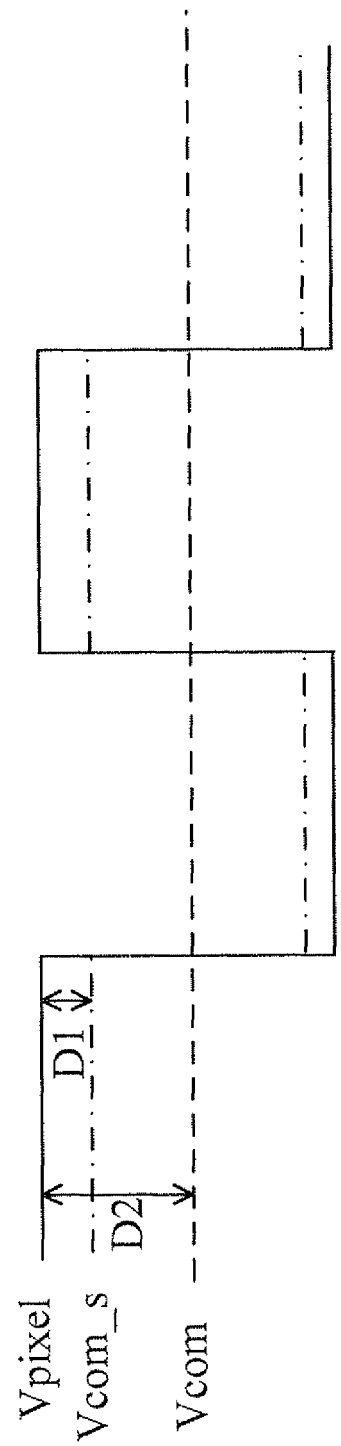

LCD AND METHOD FOR DRIVING THE SAME

BACKGROUND OF THE INVENTION

1. Field of the Invention

The present invention relates to an in-plane switching (IPS) liquid crystal display (LCD) and a method for driving the same, and more particularly, to an LCD capable of reducing crosstalk among adjacent pixels and preventing degraded quality of two-dimensional (2D) images shown on the LCD screen and a method for driving the same.

2. Description of the Prior Art

Real-world images are perceived by the human eye, and further, so-called three-dimensional (3D) images are formed inside the human brain depending on an apparent displacement of an object viewed along two different lines of sight. Such a displacement or a spatial difference is called parallax. A so-called 3D display device, simulating human vision to form different viewing angles, is capable of conveying 3D images to the viewer. The 3D display device produces two different 2D images with parallax, one for the viewer's right eye and the other for the left eye. Afterwards, the viewer's brain perceives these two different 2D images as a 3D image.

A conventional 3D display is a slit grating auto-stereoscopic display. The theorem of the slit grating auto-stereoscopic display lies on that a user sees images with parallax through both eyes based on an opaque parallax barrier, and the parallax forms stereopsis in the brain. However, the design of the slit grating auto-stereoscopic display has a defect. The defect is that, there is a limit to observation at a larger viewing angle. For example, the left eye should see a left-eye signal only through a vertical polarizer. Once the viewing angle exceeds the limit, the left eye may see a right-eye signal. Conversely, the right eye should see a right-eye signal only through the horizontal polarizer. Once the viewing angle exceeds the limit, the right eye may see a left-eye signal. So, crosstalk occurs when the viewer sees a 3D image.

As such, it is a considerable need for an LCD to resolve the problems occurring in the conventional technology.

SUMMARY OF THE INVENTION

Therefore, it is an object of the present invention to provide an LCD for overcoming a crosstalk phenomenon occurring frequently when a user sees 3D images on a conventional LCD.

According to the present invention, a liquid crystal display (LCD) comprising a substrate, a plurality of pixels, and a processing unit. The plurality of pixels disposed on the substrate are used for showing 2D or 3D images when receiving a plurality of two dimensional (2D) image signals or a plurality of three dimensional (3D) image signals. The processing unit is used for outputting the plurality of 2D image signals when receiving a 2D image enabling signal or for outputting the plurality of 3D image signals when receiving a 3D image enabling signal. Each of the plurality of pixels comprises a transistor, for conducting a grayscale signal based on the plurality of 2D image signals or the plurality of 3D image signals when receiving a scan signal; a first pixel electrode, for receiving a first voltage signal when corresponding to the 2D image enabling signal or the 3D image enabling signal; a second pixel electrode, for receiving the first voltage signal in response to the 2D image enabling signal, or for receiving a second voltage signal in response to the 3D image enabling signal, the first voltage signal being different from the second voltage signal; and a third pixel electrode, having a first end being electrically connected to the transistor, and a second end being configured to comprise two bending legs extending from the first end to embrace the first pixel electrode and the second pixel electrode so as to be configured for receiving the grayscale signal generated based on the plurality of 2D image signals or on the plurality of 3D image signals. The first pixel electrode, the second pixel electrode, and the third pixel electrode are disposed on the substrate and are not connected to one another. The two bending legs comprise a first bending leg part and a second bending leg part, the first pixel electrode is connected with a first common voltage line, extends from the first common voltage line in one direction, and disposed between the first bending leg part and the second bending leg part at a first pixel area. The second pixel electrode is connected with a second common voltage line, extends from the second common voltage line in another direction, and disposed between the first bending leg part and the second bending leg part at a second pixel area. One side of the first pixel area is near to the first end, and the other side of the first pixel area is near to the second pixel area but far from the first end;

In one aspect of the present invention, the first voltage signal is a direct-current signal.

In another aspect of the present invention, the second voltage signal is an alternating-current signal.

In another aspect of the present invention, the LCD further comprises a voltage generator, for outputting the first voltage signal to the first pixel electrode and the second pixel electrode when receiving the 2D image enabling signal, and for outputting the first voltage signal to the first pixel electrode and for outputting the second voltage signal to the second pixel electrode when receiving the 3D image enabling signal.

In still another aspect of the present invention, the LCD further comprises a first common voltage line, electrically connected to the voltage generator and the first pixel electrode, for transmitting the first voltage signal output by the voltage generator to the first pixel electrode; and a second common voltage line, electrically connected to the voltage generator and the second pixel electrode, for transmitting the second voltage signal output by the voltage generator to the second pixel electrode.

In still another aspect of the present invention, the first common voltage line is electrically connected to the voltage generator and the first pixel electrode, for transmitting the first voltage signal output by the voltage generator to the first pixel electrode, the first and second pixel electrodes are disposed on both sides of the first common voltage line, respectively, the second common voltage line is electrically connected to the voltage generator and the second pixel electrode, for transmitting the second voltage signal output by the voltage generator to the second pixel electrode, and the second pixel electrode is disposed between the first common voltage line and the second common voltage line.

In still another aspect of the present invention, a duty cycle of the second voltage signal is equal to a frame rate on the LCD monitor.

According to the present invention, a method of driving a liquid crystal display (LCD) is provided. The LCD comprises a plurality of pixels, each pixel comprising a first pixel electrode, a second pixel electrode, and a third pixel electrode, all of which are on a plane but not connected to one another. The third pixel electrode and the first pixel electrode form a first pixel area, and the third pixel electrode and the second pixel electrode form a second pixel area. The third pixel electrode has a first end electrically connected to the transistor, and a second end configured to comprise two bending legs extending from the first end to embrace the first pixel electrode and the second pixel electrode, so as to be configured for receiving a grayscale signal generated based on the 2D image signals or the 3D image signals. The method comprises: outputting 2D image signal when receiving a 2D image enabling signal; in response to the 2D image enabling signal, the third pixel electrode receiving a grayscale signal which is generated based on the 2D image signal, and the first pixel electrode and the second pixel electrode receiving a first voltage signal; outputting 3D image signal when receiving a 3D image enabling signal; and in response to the 3D image enabling signal, the third pixel electrode receiving a grayscale signal which is generated based on the 3D image signal, the first pixel electrode receiving the first voltage signal, and the second pixel electrode receiving a second voltage signal different from the first voltage signal, so that a brightness of the second pixel area is lower than that of the first pixel area. The two bending legs comprise a first bending leg part and a second bending leg part. The first pixel electrode is connected with a first common voltage line, extends from the first common voltage line in one direction, and disposed between the first bending leg part and the second bending leg part at a first pixel area. The second pixel electrode is connected with a second common voltage line, extends from the second common voltage line in another direction, and disposed between the first bending leg part and the second bending leg part at a second pixel area. One side of the first pixel area is near to the first end, and the other side of the first pixel area is near to the second pixel area but far from the first end. The first common voltage line is electrically connected to a voltage generator generating the first voltage signal and the second voltage signal and the first pixel electrode for transmitting the first voltage signal outputted by the voltage generator to the first pixel electrode. The second common voltage line is electrically connected to the voltage generator and the second pixel electrode for transmitting the second voltage signal outputted by the voltage generator to the second pixel electrode.

In one aspect of the present invention, the first voltage signal is a direct-current signal, and the second voltage signal is an alternating-current signal.

In another aspect of the present invention, a duty cycle of the second voltage signal is equal to a frame rate on the LCD monitor.

Contrast to the conventional technology, each of the plurality of pixels in the LCD of the present invention comprises a first pixel electrode, a second pixel electrode, and a third pixel electrode. The first pixel electrode is used for receiving a first voltage signal when corresponding to a 2D or 3D image enabling signal. The second pixel electrode is used for receiving the first voltage signal when corresponding to the 2D image enabling signal or receives a second voltage signal when corresponding to the 3D image enabling signal. The third pixel electrode is used for receiving the 2D or 3D image signal. The first, second, and third pixel electrodes are on the same plane and are not connected to one another. Since the first and second pixel electrodes both receives the first voltage signal (direct current) when the third pixel electrode receives the 2D image signal, a difference in voltage between the first and third pixel electrodes is equal to that between the second and third pixel electrodes. When each of the plurality of pixels shows the 2D image, the image brightness will not weaken. Contrarily, when the third pixel electrode receives the 3D image signal, the first pixel electrode keeps receiving the first voltage signal (direct current) and the second pixel electrode receives the second voltage signal (alternating current). The duty cycle of the second voltage signal is equal to a frame rate on the LCD monitor. The voltage difference between the second and third pixel electrodes is smaller than that between the first and third pixel electrodes. Thus, the brightness of a second pixel area between the second and third pixel electrodes is smaller than brightness of a first pixel area between the first and third pixel electrodes. By using the structure of the plurality of pixels and the driving method of the present invention, the brightness of the second pixel area is smaller than that of the first pixel area in each of the plurality of pixels when the 3D images are displayed. The crosstalk phenomenon is prohibited. In addition, the problem that the brightness may lower when the 2D images are displayed is resolved since the first and second pixel areas have equal brightness.

These and other features, aspects and advantages of the present disclosure will become understood with reference to the following description, appended claims and accompanying figures.

BRIEF DESCRIPTION OF THE DRAWINGS

FIG. 4 shows a relationship diagram of the first voltage signal Vcom, the second voltage signal Vcom_s, and the grayscale signal Vpixel when the 3D images are shown.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
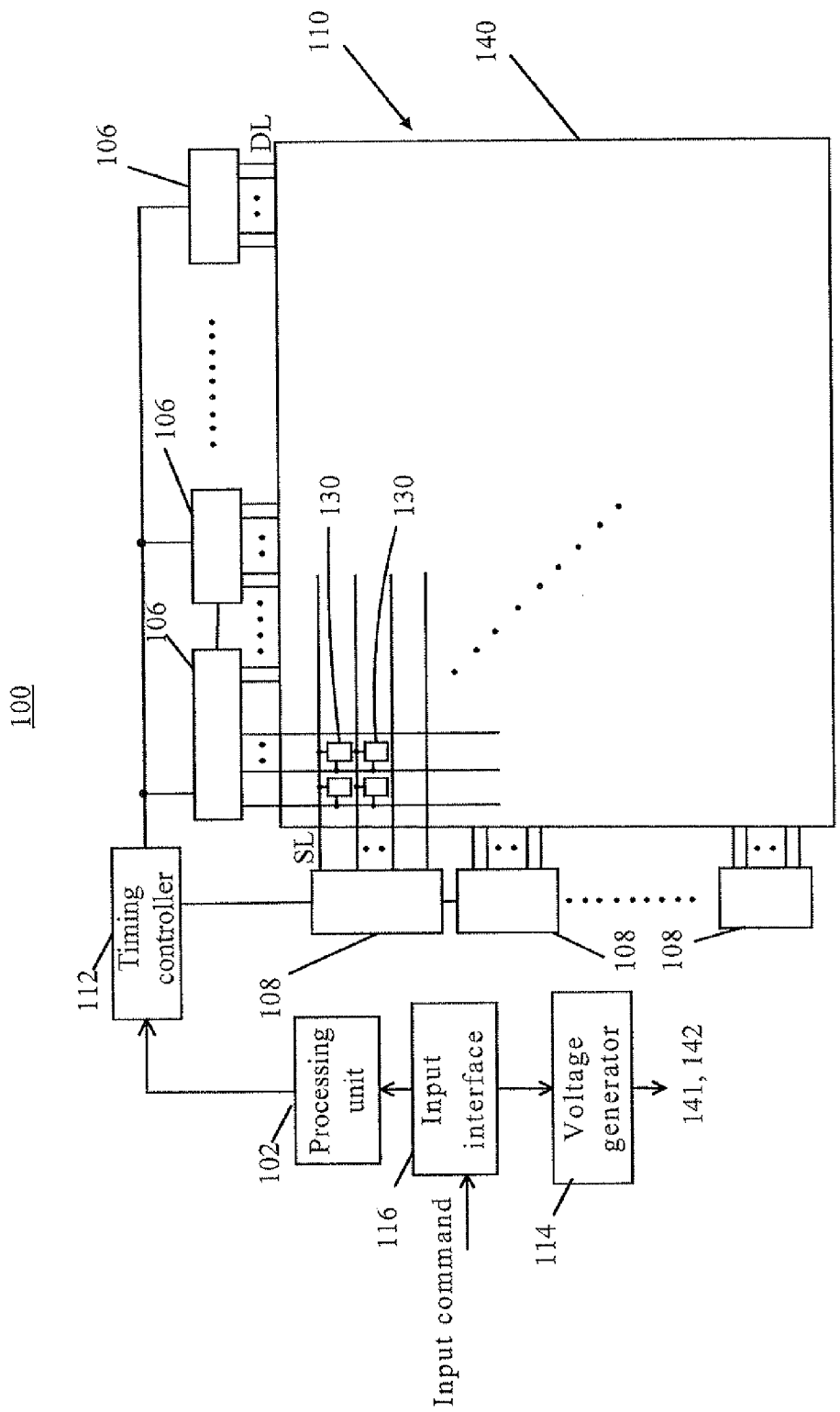
FIG. 1 shows a schematic diagram of an LCD showing 3D images in the present invention.

Referring to FIG. 1, FIG. 1 shows a schematic diagram of an LCD 100 showing 3D images in the present invention. A user can freely change 2D and 3D images on the LCD 100. The LCD 100 comprises a processing unit 102, a plurality of data drivers 106, a plurality of scan drivers 108, a timing controller 112, a voltage generator 114, an input interface 116, and an LCD panel 110. The LCD panel 110 comprises a plurality of pixels 130 and a substrate 140.

The processing unit 102 is a central processing unit (CPU) of either a personal computer (PC) or a notebook computer. The processing unit 102 is used for generating a plurality of 2D or 3D image signals. The input interface 116 is an input device controlled by the user, for example, a button disposed on the LCD 100 or a menu displayed on the screen of the LCD 100. The input interface 116 is used for generating a 2D/3D image enabling signal according to a user's input command. The processing unit 102 is electrically connected to the input interface 116. The processing unit 102 is used for outputting the plurality of 2D or 3D image signals to the timing controller 112 according to the 2D/3D image enabling signal. The voltage generator 114 is electrically connected to the input interface 116. The voltage generator 114 is used for receiving the 2D/3D image enabling signal and outputting a first voltage signal Vcom or a second voltage signal Vcom_s to a first common voltage line 141 or a second common voltage line 142 (shown in FIG. 2).

The timing controller 112 is electrically connected to the processing unit 102. The timing controller 112 is used for generating a frequency pulse signal to the plurality of scan drivers 108 based on the plurality of 2D or 3D image signal. The timing controller 112 is also used for converting the plurality of 2D or 3D image signals into a plurality of 2D or 3D data signals. The plurality of scan drivers 108 are used for outputting a scan signal according to the frequency pulse signal. The plurality of data drivers 106 are used for converting the data signal into a grayscale signal Vpixel at different voltage levels. The plurality of data drivers 106 and the plurality of scan drivers 108 are disposed on a flexible circuit board (not shown), i.e., using chip on film (COF). Alternatively, the plurality of data drivers 106 and the plurality of scan drivers 108 are disposed on the substrate 140 which is connected to another flexible circuit board, i.e., using chip on glass (COG).

Figure 2:
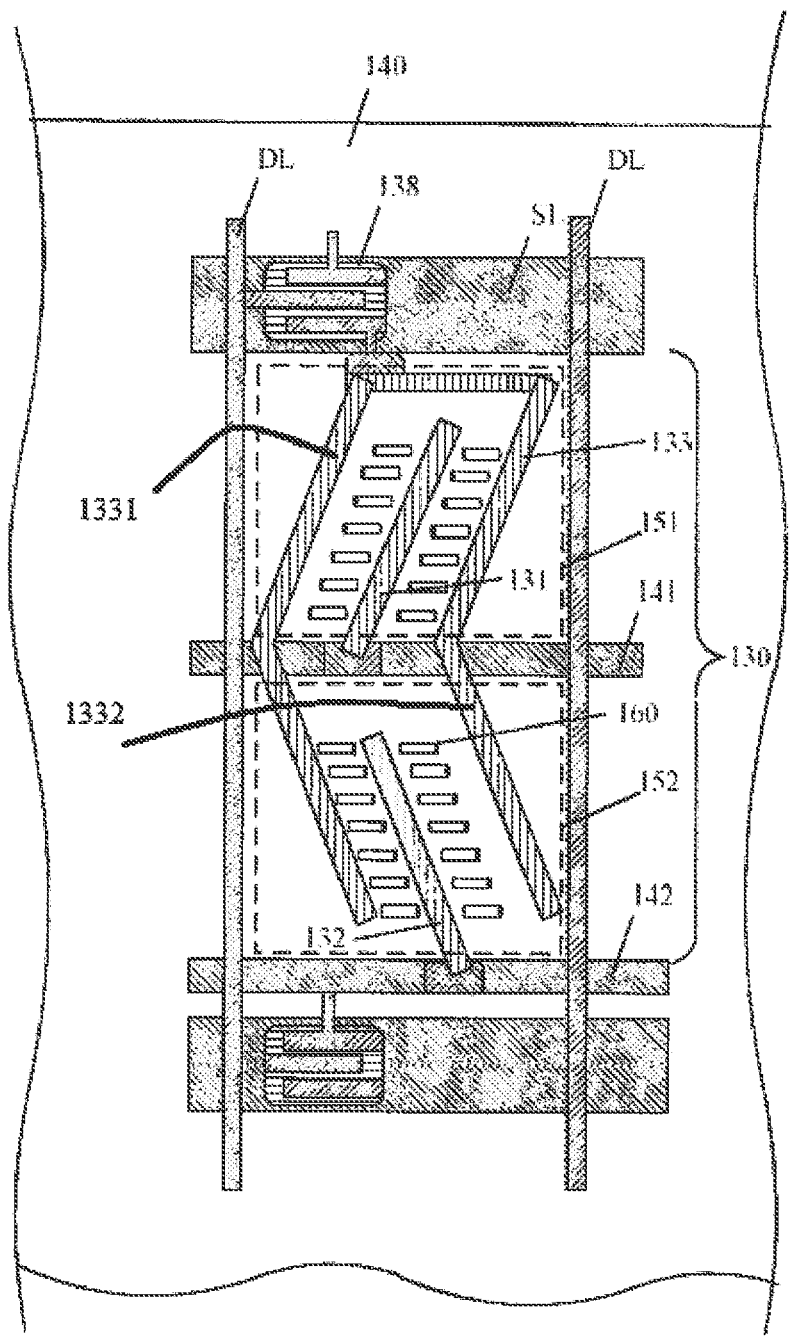
FIG. 2 shows a structure of a pixel unit shown in FIG. 1.

Referring to FIG. 1 and FIG. 2, FIG. 2 shows a structure of pixel unit 130 shown in FIG. 1. The LCD panel 110 is an In-Plane Switching (IPS) panel. Each of the plurality of pixel units 130 comprises a transistor 138, a first pixel electrode 131, a second pixel electrode 132, and a third pixel electrode 133. The first pixel electrode 131, the second pixel electrode 132, and the third pixel electrode 133 are not connected to one another. A third pixel electrode 133 has a first end electrically connected to the transistor 138, and a second end being configured to comprise two bending legs extending from the first end to embrace the first pixel electrode 131 and the second pixel electrode 132 so as to be configured for receiving the grayscale signal generated based on the 2D image signals or the 3D image signals. The first pixel electrode 131, the electrode 132, and the third pixel electrode 133 are disposed on the substrate 140 and are not connected to one another. The two bending legs a first bending leg part 1331 and a second bending leg part 1332. The first pixel electrode 131 is connected with a first common voltage line 141, extends from the first common voltage line 141 in one direction, and disposed between the first bending leg part 1331 and the second bending leg part 1332 at a first pixel area 151. The second pixel electrode 132 is connected with a second common voltage line 142, extends from the second common voltage line 142 in another direction, and disposed between the first bending leg part 1331 and the second bending leg part 1332 at a second pixel area 152. One side of the first pixel area 151 is near to the first end. The other side of the first pixel area 151 is near to the second pixel area 152 but is far away from the first end. The first pixel electrode 131 is electrically connected to the first common voltage line 141. The second pixel electrode 132 is electrically connected to the second common voltage line 142. Preferably, the first pixel electrode 131 and the second pixel electrode 132 are disposed on both sides of the first common voltage line 141, respectively, and the second pixel electrode 132 is disposed between the first common voltage line 141 and the second common voltage line 142. The transistor 138 has a gate, a source and a drain. The gate, the source and the drain are electrically connected to a scan line SL, a data line DL, and the third pixel electrode 133, respectively. The frequency pulse signal generated by the timing controller 112 is transmitted to the plurality of scan drivers 108. The plurality of scan drivers 108 generate a plurality of scan signals successively. The plurality of scan signals are transmitted to the LCD panel 110 through the scan line SL. Then, the transistor 138 of each of the plurality of pixel units 130 in each row in the LCD panel 110 is turned on successively. While the transistor 138 of each of the plurality of pixel units 130 in each row is turned on, the plurality of data drivers 106 generate the corresponding grayscale signal Vpixel based on the plurality of 2D/3D image signals and transmit the grayscale signal Vpixel to the third pixel electrode 133 of each of the plurality of pixel units 130 in each row through the data line DL. The first pixel electrode 131 and the second pixel electrode 132 are electrically connected to the first common voltage line 141 and the second common voltage line 142, respectively. The first and second pixel electrodes 131 and 132 are used for receiving the first voltage signal Vcom or the second voltage signal Vcom_s generated by the voltage generator 114. Liquid crystal (LC) 160 disposed between the first and third pixel electrodes 131 and 133 rotates depending on the difference in voltage between the first and third pixel electrodes 131 and 133. The LC 160 disposed between the second and third pixel electrodes 132 and 133 rotates depending on the difference in voltage between the second and third pixel electrodes 132 and 133. The first, second, and third pixel electrodes 131, 132, and 133 are all disposed on the substrate 140, so the flat electric field among the first, second, and third pixel electrodes 131, 132, and 133 has an influence on the LC 160 on each of the plurality of pixels 130. The LC 160 rotates on the same plane without a specific alignment. A viewer can only see a shorter axis of the LC 160 whenever he/she uses the LCD panel 110. There is little difference in viewing images at any angle. Accordingly, it is allowed to broaden the viewing angle of the LCD 100 and to correct grayscale inversion and color shift effectively. Each of the plurality of pixels 130 is divided to a first pixel area 151 and a second pixel area 152 in the present embodiment. The first pixel area 151 indicates an area compassed by the LC 160 influenced by the electric field between the first and third pixel electrodes 131 and 133. The second pixel area 152 indicates an area compassed by the LC 160 influenced by the electric field between the second and third pixel electrodes 132 and 133.

Figure 3:
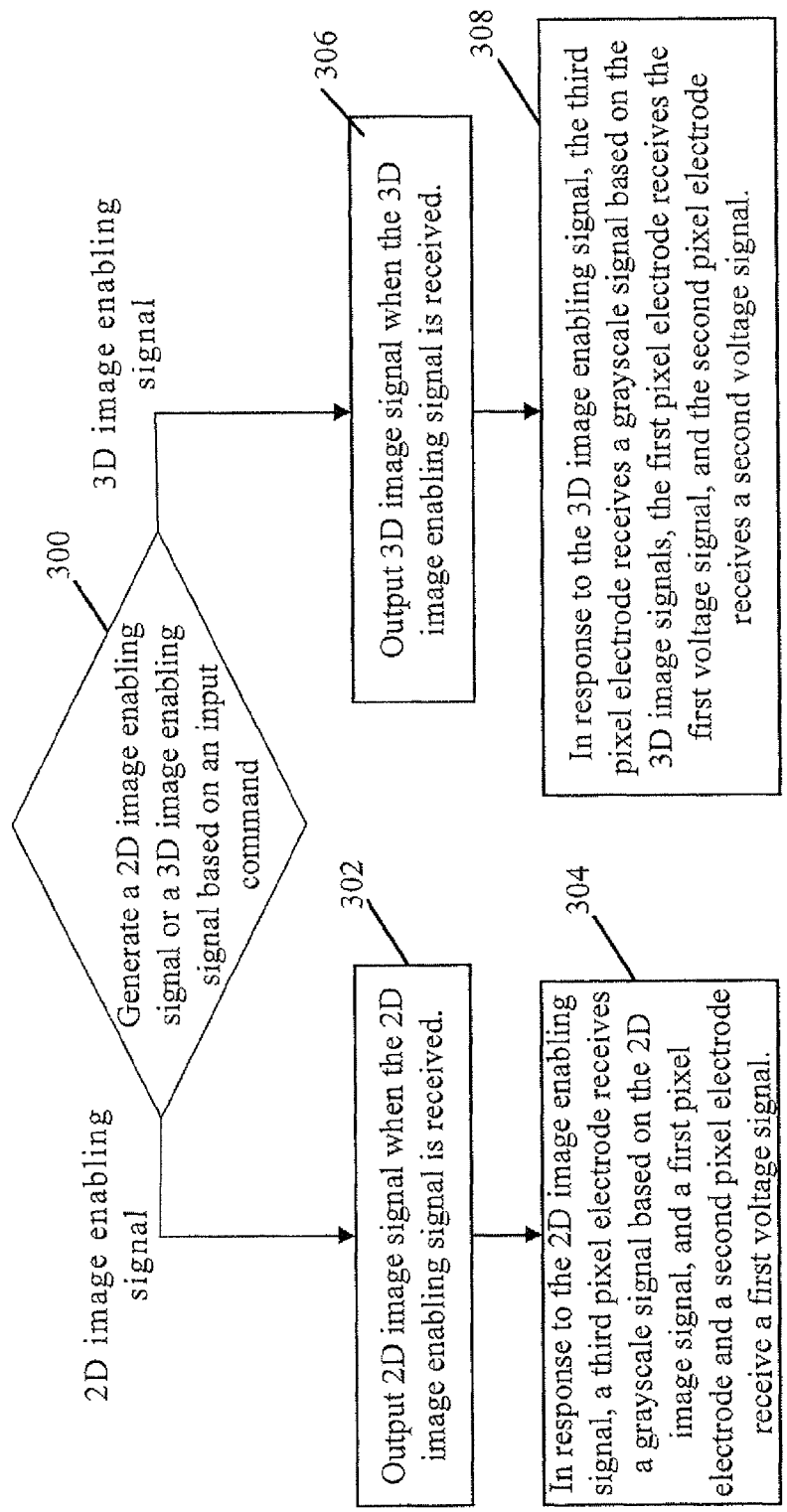
FIG. 3 shows a flowchart of driving the LCD in the present invention.

Referring to FIGS. 1 to 3, FIG. 3 shows a flowchart of driving the LCD 100 in the present invention. The third pixel electrode 133, having a first end being electrically connected to the transistor 138, and a second end being configured to comprise two bending legs extending from the first end to embrace the first pixel electrode 131 and the second pixel electrode 132 so as to be configured for receiving the grayscale signal generated based on the plurality of 2D image signals or on the plurality of 3D image signals. The first pixel electrode 131, the second pixel electrode 132, and the third pixel electrode 133 are disposed on the substrate 140 and are not connected to one another. Wherein, the two bending legs comprise a first bending leg part 1331 and a second bending leg part 1332, the first pixel electrode 131 is connected with a first common voltage line 141, extends from the first common voltage line 141 in one direction, and disposed between the first bending leg part 1331 and the second bending leg dart 1332 at a first pixel area 151, the second pixel electrode 132 is connected with a second common voltage line 142, extends from the second common voltage line 142 in another direction, and disposed between the first bending leg part 1331 and the second bending leg part 1332 at a second pixel area 152, one side of the first pixel area 151 is near to the first end, the other side of the first pixel area 151 is near to the second pixel area 152 but far from the first end. The driving method comprises the following steps:

Step 300: Generate a 2D image enabling signal or a 3D image enabling signal based on an input command.

Step 302: Output 2D image signal when the 2D image enabling signal is received.

Step 304: In response to the 2D image enabling signal, a third pixel electrode receives a grayscale signal based on the 2D image signal, and a first pixel electrode and a second pixel electrode receive a first voltage signal.

Step 306: Output 3D image signal when the 3D image enabling signal is received.

Step 308: In response to the 3D image enabling signal, the third pixel electrode receives a grayscale signal based on the 3D image signals, the first pixel electrode receives the first voltage signal, and the second pixel electrode receives a second voltage signal. Accordingly, the brightness of a second pixel area is smaller than that of a first pixel area, and the first voltage signal is different from the second voltage signal.

The input interface 116 generates the 2D image enabling signal. Next, the processing unit 102 outputs the plurality of 2D image signals, and the voltage generator 114 outputs the first voltage signal Vcom to the first and second pixel electrodes 131 and 132 through the first and second common voltage lines 141 and 142. The first voltage signal Vcom is a direct current (DC) voltage signal. Meanwhile, the plurality of data drivers 106 output the corresponding grayscale signal Vpixel to the plurality of pixel units 130 based on the plurality of 2D image signals. The third pixel electrode 133 of the plurality of pixel units 130 receives the grayscale signal Vpixel generated based on the plurality of 2D image signals through the transistor 138. Thus, the difference in voltage between the third pixel electrode 133 and the first pixel electrode 131 is equal to that between the third pixel electrode 133 and the second pixel electrode 132. As a result, the LC 160 on the first and second pixel areas 151 and pixel area 152 has a consistent alignment and produces consistent brightness.

Referring to FIG. 4, FIG. 4 shows a relationship diagram of the first voltage signal Vcom, the second voltage signal Vcom_s, and the grayscale signal Vpixel when the 3D images are shown. At first, the input interface 116 generates the 3D image enabling signal. Then, the processing unit 102 outputs the plurality of 3D image signals. The plurality of data drivers 106 output the corresponding grayscale signal Vpixel to the plurality of pixel units 130 based on the plurality of 3D image signals. Meanwhile, the voltage generator 114 outputs the first voltage signal Vcom to the first pixel electrode 131 through the first common voltage line 141 and outputs the second voltage signal Vcom_s to the second pixel electrode 132 through the second common voltage line 142. The first voltage signal Vcom is the DC voltage signal while the second voltage signal Vcom_s is an alternating current (AC) voltage signal. The duty cycle of the second voltage signal Vcom_s is equal to a frame rate on the LCD 100 monitor. For example, when the frame rate on the LCD 100 monitor is 120 Hz, the duty cycle of the second voltage signal Vcom_s is 120 Hz as well. When the LCD 100 is driven by using a frame inversion, positive polarity and negative polarity of the grayscale signal Vpixel applied to the plurality of pixel units 130 alternate at a regular frame rate. The grayscale signal Vpixel having the positive polarity suggests that the grayscale signal Vpixel has a voltage larger than a constant voltage (for example, the first voltage signal Vcom). Conversely, the grayscale signal Vpixel having the negative polarity suggests that the grayscale signal Vpixel has a voltage smaller than the constant voltage. Therefore, to comply with the frame inversion, the second voltage signal Vcom_s is larger the constant voltage (for example, the first voltage signal Vcom) when the grayscale signal Vpixel having the positive polarity; the second voltage signal Vcom_s is smaller the constant voltage when the grayscale signal Vpixel having the negative polarity.

The difference in voltage affects the rotation of the LC 160. The larger the voltage difference is, the more obvious the rotation of the LC 160 becomes. The brightness of the pixel areas which the LC 160 corresponds to becomes larger. When the 3D images are displayed on the LCD 100 screen, an absolute value of the voltage difference D1 between the grayscale signal Vpixel received by the third pixel electrode 133 and the second voltage signal Vcom_s received by the second pixel electrode 132 is smaller than an absolute value of the voltage difference D2 between the grayscale signal Vpixel received by the third pixel electrode 133 and the first voltage signal Vcom received by the first pixel electrode 131. As a result, the brightness of the first pixel area 151 is larger than that of the second pixel area 152. When the 3D images are displayed on the LCD 100 screen, the first pixel area 151 is brighter, and the second pixel area 152 is darker. The darker second pixel area 152 has an effect of overcast on human's vision so that the crosstalk between the adjacent pixels 130 can be effectively reduced.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD), comprising a substrate, a plurality of pixels, and a processing unit, the plurality of pixels disposed on the substrate, for showing 2D or 3D images when receiving a plurality of two dimensional (2D) image signals or a plurality of three dimensional (3D) image signals, the processing unit, for outputting the plurality of 2D image signals when receiving a 2D image enabling signal or for outputting the plurality of 3D image signals when receiving a 3D image enabling signal, each of the plurality of pixels comprising:
    a transistor, for conducting a grayscale signal based on the plurality of 2D image signals or the plurality of 3D image signals when receiving a scan signal;
    a first pixel electrode, for receiving a first voltage signal when corresponding to the 2D image enabling signal or the 3D image enabling signal;
    a second pixel electrode, for receiving the first voltage signal in response to the 2D image enabling signal, or for receiving a second voltage signal in response to the 3D image enabling signal, the first voltage signal being different from the second voltage signal; and
    a third pixel electrode, having a first end being electrically connected to the transistor, and a second end being configured to comprise two bending legs extending from the first end to embrace the first pixel electrode and the second pixel electrode so as to be configured for receiving the grayscale signal generated based on the plurality of 2D image signals or on the plurality of 3D image signals;
    wherein the first pixel electrode, the second pixel electrode, and the third pixel electrode are disposed on the substrate and are not connected to one another;
    wherein the two bending legs comprise a first bending leg part and a second bending leg part, the first pixel electrode is connected with a first common voltage line, extends from the first common voltage line in one direction, and is disposed between the first bending leg part and the second bending leg part at a first pixel area, and the second pixel electrode is connected with a second common voltage line, extends from the second common voltage line in another direction, and is disposed between the first bending leg part and the second bending leg part at a second pixel area, one side of the first pixel area is near to the first end, and the other side of the first pixel area is near the second pixel area but far away from the first end;
    wherein the first common voltage line is electrically connected to a voltage generator generating the first voltage signal and the second voltage signal and the first pixel electrode for transmitting the first voltage signal outputted by the voltage generator to the first pixel electrode; and the second common voltage line is electrically connected to the voltage generator and the second pixel electrode for transmitting the second voltage signal outputted by the voltage generator to the second pixel electrode.

2. The LCD as claimed in claim 1 wherein the first voltage signal is a direct-current signal.

3. The LCD as claimed in claim 1 wherein the second voltage signal is an alternating-current signal.

4. The LCD as claimed in claim 1, wherein the voltage generator is used for outputting the first voltage signal to the first pixel electrode and the second pixel electrode when receiving the 2D image enabling signal, and for outputting the first voltage signal to the first pixel electrode and for outputting the second voltage signal to the second pixel electrode when receiving the 3D image enabling signal.

5. The LCD as claimed in claim 4, wherein the first common voltage line is electrically connected to the voltage generator and the first pixel electrode, for transmitting the first voltage signal output by the voltage generator to the first pixel electrode, the first and second pixel electrodes are disposed on both sides of the first common voltage line, respectively, the second common voltage line is electrically connected to the voltage generator and the second pixel electrode, for transmitting the second voltage signal output by the voltage generator to the second pixel electrode, and the second pixel electrode is disposed between the first common voltage line and the second common voltage line.

6. The LCD as claimed in claim 1, wherein a duty cycle of the second voltage signal is equal to a frame rate on the LCD monitor.

7. A method of driving a liquid crystal display (LCD) comprising a plurality of pixels, each pixel comprising a first pixel electrode, a second pixel electrode, and a third pixel electrode, all of which being disposed on the substrate and not connected to one another, the third pixel electrode and the first pixel electrode forming a first pixel area, and the third pixel electrode and the second pixel electrode forming a second pixel area, the third pixel electrode having a first end being electrically connected to the transistor, and a second end being configured to comprise two bending leg extending from the first end to embrace the first pixel electrode and the second pixel electrode, so as to be configured for receiving a grayscale signal generated based on the plurality of 2D image signals or on the plurality of 3D image signals, the method comprising:

outputting 2D image signal when receiving a 2D image enabling signal;

in response to the 2D image enabling signal, the third pixel electrode receiving the grayscale signal which is generated based on the 2D image signal, and the first pixel electrode and the second pixel electrode receiving a first voltage signal;

outputting 3D image signal when receiving a 3D image enabling signal; and in response to the 3D image enabling signal, the third pixel electrode receiving the grayscale signal which is generated based on the 3D image signal, the first pixel electrode receiving the first voltage signal, and the second pixel electrode receiving a second voltage signal different from the first voltage signal, so that a brightness of the second pixel area is lower than that of the first pixel area;

wherein the two bending legs comprise a first bending leg part and a second bending leg part, the first pixel electrode is connected with a first common voltage line, extends from the first common voltage line in one direction, and is disposed between the first bending leg part and the second bending leg part at a first pixel area, the second pixel electrode is connected with a second common voltage line, extends from the second common voltage line in another direction, and is disposed between the first bending leg part and the second bending leg part at a second pixel area, one side of the first pixel area is near to the first end, the other side of the first pixel area is near to the second pixel area but far from the first end;

wherein, the first common voltage line is electrically connected to a voltage generator generating the first voltage signal and the second voltage signal and the first pixel electrode for transmitting the first voltage signal outputted by the voltage generator to the first pixel electrode; and the second common voltage line is electrically connected to the voltage generator and the second pixel electrode for transmitting the second voltage signal outputted by the voltage generator to the second pixel electrode.

8. The method of driving an LCD as claimed in claim 7, wherein the first voltage signal is a direct-current signal, and the second voltage signal is an alternating-current signal.

9. The method of driving an LCD as claimed in claim 7, wherein a duty cycle of the second voltage signal is equal to a frame rate on the LCD monitor.

* * * * *